(12) United States Patent
Yarbro

(10) Patent No.: US 9,051,521 B2
(45) Date of Patent: Jun. 9, 2015

(54) USING SUPERCRITICAL FLUIDS TO REFINE HYDROCARBONS

(71) Applicant: Stephen Lee Yarbro, Los Alamos, NM (US)

(72) Inventor: Stephen Lee Yarbro, Los Alamos, NM (US)

( * ) Notice: Subject to any disclaimer, the term of this patent is extended or adjusted under 35 U.S.C. 154(b) by 0 days.

(21) Appl. No.: 13/838,746

(22) Filed: Mar. 15, 2013

(65) Prior Publication Data

US 2013/0206645 A1    Aug. 15, 2013

Related U.S. Application Data

(63) Continuation-in-part of application No. 12/978,294, filed on Dec. 23, 2010.

(51) Int. Cl.

| | |
|---|---|
| *C10G 47/32* | (2006.01) |
| *C10G 31/08* | (2006.01) |
| *C10G 1/04* | (2006.01) |
| *C10G 21/06* | (2006.01) |
| *C10G 27/04* | (2006.01) |
| *C10G 53/14* | (2006.01) |
| *C10G 55/04* | (2006.01) |
| *C10K 3/04* | (2006.01) |
| *C10G 9/00* | (2006.01) |
| *B01D 3/00* | (2006.01) |

(52) U.S. Cl.
CPC .................. *C10G 47/32* (2013.01); *C10G 31/08* (2013.01); *C10G 1/047* (2013.01); *C10G 21/06* (2013.01); *C10G 2300/4006* (2013.01); *C10G 2300/4012* (2013.01); *C10G 27/04* (2013.01); *C10G 53/14* (2013.01); *C10G 55/04* (2013.01); *C10K 3/04* (2013.01); *C10G 9/00* (2013.01); *C10G 2300/4043* (2013.01); *C10G 2300/405* (2013.01); *B01D 3/009* (2013.01)

(58) Field of Classification Search
CPC .......... C10G 1/00; C10G 1/002; C10G 1/006; C10G 1/008; C10G 1/02; C10G 1/04; C10G 21/00; C10G 21/06; C10G 31/08; C10G 2300/4006; C10G 2300/4012; B01D 2011/00; B01D 2011/002; B01D 2011/005; B01D 2011/007
USPC ......... 208/298, 391, 107, 130, 264, 390, 428, 208/430, 435; 95/31–35; 196/98, 100, 103, 196/138, 139; 202/185.1, 185.2; 210/781, 210/787–789, 657; 96/221, 234, 322
See application file for complete search history.

(56) References Cited

U.S. PATENT DOCUMENTS 2,541,070 A * 2/1951 Jones et al. .................... 208/308
3,948,754 A * 4/1976 McCollum et al. ........... 208/391

(Continued)

OTHER PUBLICATIONS

Canel, M. et al., "Extraction of solid fuels with sub- and supercritical water"; Fuel, 1994, pp. 1776-1780, vol. 73, No. 11, Butterwortth-Heinemann Ltd.

*Primary Examiner* — Prem C Singh
*Assistant Examiner* — Brandi M Doyle
(74) *Attorney, Agent, or Firm* — Rod D. Baker

(57) ABSTRACT

A system and method for reactively refining hydrocarbons, such as heavy oils with API gravities of less than 20 degrees and bitumen-like hydrocarbons with viscosities greater than 1000 cp at standard temperature and pressure, using a selected fluid at supercritical conditions. A reaction portion of the system and method delivers lightweight, volatile hydrocarbons to an associated contacting unit which operates in mixed subcritical/supercritical or supercritical modes. Using thermal diffusion, multiphase contact, or a momentum generating pressure gradient, the contacting unit separates the reaction products into portions that are viable for use or sale without further conventional refining and hydro-processing techniques.

14 Claims, 6 Drawing Sheets

(56) References Cited

U.S. PATENT DOCUMENTS

| | | | |
|---|---|---|---|
| 3,948,755 A * | 4/1976 | McCollum et al. | 208/391 |
| 4,483,761 A * | 11/1984 | Paspek, Jr. | 208/106 |
| 5,759,385 A * | 6/1998 | Aussillous et al. | 208/187 |
| 6,821,413 B1 * | 11/2004 | Alkhalidl | 208/339 |
| 2002/0134704 A1 * | 9/2002 | Mitchell et al. | 208/13 |
| 2007/0007168 A1 * | 1/2007 | Zhao et al. | 208/45 |
| 2008/0099374 A1 * | 5/2008 | He et al. | 208/177 |

* cited by examiner

A curved motion is imparted to the fluid to cause the heavier molecules to move to outer radius Momentum Diffusion Depiction of nozzle to impart curved motion on the flow to separate heavy from light compounds Depiction of vortex tube to impart curved motion on the flow to separate heavy from light compounds

USING SUPERCRITICAL FLUIDS TO REFINE HYDROCARBONS

CROSS-REFERENCE TO RELATED APPLICATIONS

This application is a continuation-in-part of, and claims priority to, co-pending U.S. patent application Ser. No. 12/978,294 filed on 23 Dec. 2010, entitled "Using Supercritical Fluids to Refine Hydrocarbons," the entirety of which is incorporated herein by reference.

STATEMENT REGARDING FEDERALLY SPONSORED R&D

This invention was made with Government support under Contract No. DE-AC52-06NA25396 awarded by the U.S. Department of Energy to Los Alamos National Security for the management and operation of the Los Alamos National Laboratory. The Government has certain rights in this invention.

BACKGROUND OF THE INVENTION

1. Field of the Invention

The present invention relates to using a supercritical fluid, typically water, with or without additives such as inorganic salts such as NaOH or KOH which increase the pH and the subsequent solvent capacity, selected hydrocarbons, or other soluble elements or compounds such as oxygen, air, carbon monoxide or carbon dioxide, to refine hydrocarbons such as heavy oil, bitumen and bitumen-like hydrocarbons.

2. Description of the Prior Art

World oil supply is changing, and the readily available medium to light crude oil reserves are getting harder to find and develop. Because the world energy demand is increasing, particularly in emerging economies such as India and China, exploitation of heavier oil reserves will be necessary to meet the demand as an alternative to more exploration and developing conventional oil reserves. Recovery and field development techniques for unconventional reserves have been progressing, such as with steam assisted gravity drainage (SAGD). Current refining technology, however, often is based on combinations of feed de-salting and high-vacuum distillation, followed by conventional hydrocracking, or a combination of coking and thermal cracking followed by some form of hydro-processing using various catalysts and process gases. Known techniques require complex, expensive equipment and an involved refinery infrastructure that includes capacity to produce hydrogen, heating fuel and maintain equipment and supplies. Conventional approaches also generate large amounts of carbon dioxide from the heating required to drive the main distillation column, as well as associated upstream and downstream processing.

Against the foregoing background, the methods and apparatuses disclosed hereinafter were developed. The disclosed methods and apparatuses produce similarly desirable products with fewer processing steps and therefore lower costs, increase worker safety due to fewer process steps and less reagent handling, allow greater opportunity for new oil field development and subsequent positive economic impact, and reduce the amount of carbon dioxide and associated waste products typically associated with conventional refineries.

U.S. Pat. No. 3,989,618 discloses a process for upgrading a hydrocarbon fraction by contacting the hydrocarbons with supercritical water over a temperature range of 600° F. to 900° F. with no catalyst of added hydrogen. However, other additives are an important part of the process; the patent discloses that it is useful to add a biphenyl, pyridine, partly hydrogenated aromatic oil, or a mono- or polyhydric compound such as methanol to the water to aid in the hydrocarbon upgrading process. This method requires the use of carcinogens such as aromatic hydrocarbons to aid the reaction process. The aromatic hydrocarbons provide an in-situ source of hydrogen, with a penalty of having to add reagents to allow operation at lower temperatures and pressures. In addition, the process does not provide a method for handling the unreacted portion of the feed, or a means to control the reaction so that the product distribution can be controlled.

U.S. Pat. No. 4,818,370 discloses a process for upgrading heavy oil in a subterranean reservoir using supercritical "brine" in combination with in-situ combustion to provide heat. The brine is salt water typically found in oil reservoirs. An oxidizing gas is injected into the underground oil reservoir to enable a combustion zone that heats the heavy oil to allow it to drain into the combustion zone (which already contains the brine), and the brine and oil are heated and pressurized to supercritical conditions. After a suitable time, the heavy oil is converted to lighter components that are removed from the reservoir using conventional recovery methods. This method is limited to working with heavy hydrocarbons in-situ, and the efficiency of the method is dependent on the reservoir conditions and physical properties. No method is described to provide control of the reaction conditions such as the rate, contact times, reagent ratios, temperature, or pressure. It would be difficult to ensure that optimal conditions are maintained to get the best product distribution. In addition, the process requires additional means to inject oxidizing gases and recover the combustion gases that contribute to the carbon footprint of the process.

U.S. Patent Application Publication 2007/0056881 A1 discloses a method for upgrading heavy hydrocarbons and the like using a flow-through reactor to contact heavy hydrocarbons with water at temperatures ranging from 250° C. to 450° C., and pressures ranging from 500 psi to 3000 psi. The method uses a simple reactor with inlet ports for the water and the hydrocarbons into the reactor, and an outlet port that directs the water-oil mix to a cooler that cools the mixture and allows separation. Other conditions described are residence times from 28 seconds to 10 minutes, and the additional allowance to introduce carbon monoxide or selected inert gases such as nitrogen into the reactor. However, the publication does not describe means to control the product distribution or quality, nor means to deal with unreacted heavy hydrocarbons. It is known that any heavy oil or bitumen processing method produces coke or other refractory carbonaceous material that must be handled in some fashion. This publication does not describe a method for handling carbonaceous residues that can be deleterious to reactor operation.

U.S. Pat. No. 7,754,067 discloses a system and method for upgrading heavy hydrocarbons and the like using supercritical water, with means for contacting the hydrocarbons and supercritical water in two separate heating stages. In a first zone, heavy hydrocarbons are mixed with supercritical water at pressures above 22.1 MPa at temperatures up to 775 K, and then in the second zone, the mixture is heated either by an external source or by bleeding in oxygen to heat the fluid in situ up to 870 K to 1075 K. The system also has a convoluted or multi-pass contacting device with a nozzle to try to disperse the hydrocarbons into the supercritical water. The method is limited by the formation of solid carbonaceous materials that necessitate the shutdown and clean out of the reactor. The multi-pass portion required to effect the necessary mixing also limits the means to effectively clean and maintain the contacting device. In addition, the heating profile described is complex and requires shortened heat-up times between the heating stages to reduce coke formation. This limits the operating time and potential throughput of the method.

U.S. Pat. No. 7,144,148 discloses a method for upgrading heavy oil and the like using a supercritical solvating hydrocarbon, and means for contacting the heavy oil and solvating solvent using a fluidized bed of hot solids. The heavy hydrocarbons are contacted with the supercritical solvating hydrocarbon in a first fluidized bed at temperatures at or below 538° C., with the solid particulates providing a method for heat transfer. After reaction, the lighter hydrocarbons are removed and the solids transported to a second bed to remove accumulated coke formation. This method, however, is limited by using a solvating hydrocarbon to essentially dissolve and then react with the heavy hydrocarbons. This necessitates a solvent removal and recycle step along with handling the solid particulates used to transfer heat to the reaction mixture. An additional solids removal step is required to prevent the solid particulates from affecting downstream processing.

SUMMARY OF THE INVENTION

There is disclosed a system and method for using a fluid, typically water, at supercritical conditions and preferably with a pH that is basic, for improved refinement of heavy hydrocarbons. A possible embodiment of the disclosed supercritical fluid refining method upgrades and separates the components of heavy hydrocarbons, such as heavy oils with API gravities of less than 20 degrees, and/or bitumen-like compounds with viscosities greater than 1000 cp measured at standard conditions. One preferred embodiment uses a supercritical fluid, preferably water, possibly without but preferably with additives, most preferably NaOH or KOH or $Ca(OH)_2$ additives. An embodiment of a system according to the present disclosure features a reactor portion and a separating portion.

A supercritical fluid in the reactor portion of the system and method efficiently dissolves and extracts the heavy oil/bitumen from a porous solid, and then thermally splits the higher molecular weight hydrocarbons to lighter, more volatile hydrocarbons. If the supercritical fluid is water as preferred, supercritical water has a solubility product Kw, which is about five orders of magnitude greater than at normal temperature and pressure. Consequently, highly active free hydroxyl radicals are present which promote the thermal cracking process. In a preferred embodiment, approximately 0.1 to 1.0M NaOH is added to the fluid to increase the concentration of OH— radicals. Additionally, in a preferred embodiment or alternative embodiments, ammonia and/or triethanolamine (which contains alcohol), may be added to the fluid mix to also increase the pH and supply additional hydrogen to the hydrogen released from the water itself. The additional hydrogen "caps" the ends of broken hydrocarbon chains, reduces the viscosity of the oil, and increases the API gravity. Also, ammonia by itself is an efficient solvent for heavy hydrocarbons, and enables the oil to go into solution at lower temperatures and pressures. Increasing the sodium hydroxide concentration to greater than about 5-6M can dissolve the carbon out of coal and similar carbonaceous solids.

In the reactor portion of the system and method, the oxidizing with air or oxygen of a small portion of the oil or other hydrocarbons generates heat and carbon monoxide, which reacts with the water to produce yet more hydrogen, generating a very light hydrocarbon. The supercritical reaction portion of the system and method is somewhat similar in this very general respect to a "reboiler" in a conventional distillation column. A significant difference between the reaction portion of the present invention and a conventional "reboiler," however, is that the supercritical reaction in the present system and method generates a different set of compounds. By thermally cracking the heavier hydrocarbons and adding hydrogen, new compounds are generating with a different set of molecular weights and volatilities. These different weights and volatilities can then be used to separate these compounds as opposed to the conventional separation by volatility in a standard reboiler system. The lighter weight, more volatile, hydrocarbons are introduced to the separating portion of the system and method. These compounds can be further separated according to the present invention with a thermal or pressure gradient (as distinguished from merely separating compounds due to volatility).

The reactor portion of the invention introduces the lower-boiling compounds to the separating portion at the same or lower pressure as the reactor portion. According to the present system and method, a thermal or pressure gradient across the separating portion then separates the hydrocarbon mixture into higher-value portions to use or sell, without further complex and expensive conventional refining and hydro-processing.

In a first embodiment, a thermal gradient is imposed by introducing the hotter supercritical fluid from the supercritical reboiler into an inner column of the separating portion of the system. The supercritical fluid flows in an inner column within the separating portion, while an outer wall remains cooler in temperature to condense thereon the various compounds along the vertical length of the separating portion. The fluid may then recirculate in a circuit between the inner column and the relatively cooler outer wall, subject to the desirable products being "tapped off." The mixture countercurrently contacts the condensed and non-condensed phases of the reaction products until the mixture is partially or completely condensed at the final stage (which is typically a condenser). Contacting occurs in stages whereby contacting between liquids and vapors is repeated to enrich the vapor in the more volatile components. Since the resulting vapor is usually enriched, a condenser serves as the last stage. A portion of the circulating mix containing the desired reaction product components may be returned to the system as reflux.

According to the foregoing, the separating portion of the system operates as an efficient wetted-wall column, although other contacting configurations within the scope of the invention can be envisioned. A condensed liquid phase of reaction products accumulates on the inside of the cooler outer wall, and provides a stable interfacial surface for contacting with the hotter vapor phase reaction products arriving from inside the inner column. This mode of operation exploits the higher diffusion coefficients manifested by supercritical fluids, and thus can deliver various reaction product compositions.

The reactor portion delivers thermally-cracked, lower molecular weight (and therefore lower temperature boiling) components in various combinations to enhance the performance of the column in the separating portion. Furthermore, the reactor portion removes solids and sulfur compounds that otherwise form from the various metals or salts present in the heavy hydrocarbon feed; subcritical water may be supplied into the reactor portion to remove accumulated salt material from within the reactor or a downstream separating unit. Periodically, the reactor portion removes any carbonaceous material formation by adding air or oxygen to the supercritical fluid, typically water, to oxidize any solid carbonaceous material deposited in the reactor and separating portions.

In a second possible embodiment, a thermal gradient in the separating portion (at constant pressure) separates reaction product compounds based on isotopic weight, molecular size and/or shape or other physical properties. This second embodiment exploits the concept of circulating a single dense gas phase that allows diffusion to concentrate different reaction product compounds in different regions of the separating portion. In this alternative embodiment, the inner column is at a higher temperature than a second, outer, wall. If operated at a constant pressure to maintain a single gas phase, the gas nearest the hot inner wall rises, and gas cooled by the outer wall "falls" or descends within the separating portion. This circulation pattern separates reaction product hydrocarbons based on weight, as heavy hydrocarbons concentrate closer to the walls, and lighter hydrocarbons tend to collect toward the center of the flow channel to enable a separation. The different molecular weights correspond to different boiling points, and provide the same or similar reaction products as a distillation column, but with a much simpler equipment configuration and less energy use.

In a third embodiment, a momentum gradient in the separating portion at constant pressure separates reaction products compounds based on isotopic weight, molecular size and/or shape or other physical properties. Included in this category of separation processes are the separation nozzle processes, opposed gas jets processes, gas vortexes, separation probes, and jet penetration processes. A number of these aerodynamic separation processes depend, as does a gas centrifuge process, on pressure diffusion associated with curved streamlines for the basic separation effect. In particular, the benefit to be gained from a lighter supercritical phase, typically water, with the heavier hydrocarbons in solution further enhances separation by providing much lighter compounds that are displaced by the heavier hydrocarbons. The activity of moving through the lighter phase further separates the heavier hydrocarbons, enhancing efficiency much like a sieve or filter arrangement. Any or all of these methods can be used to separate the hydrocarbon reaction products compounds. By way of further disclosure of the concept, this embodiment circulates a single phase of material in a manner which allows momentum to concentrate different compounds in different regions of the separating portion. The momentum is generated by creating a centrifugal force (by using fluid nozzles, curved walls, or other suitable means) to impose, for example, a rotating motion in the gas phase, thereby causing the heavier molecules to move in a different pattern than lighter molecules. The momentum induced pressure gradient is imposed by using specially designed nozzles and/or walls, or a centrifuge, to force a curved flow on the dense gas containing the hydrocarbons of different weights. The resulting curved flow in the gas causes the heavier hydrocarbon reaction products to collect toward the outer radius and forces the lighter hydrocarbon products to collect toward the inner radius. In this manner, the reaction products can be separated based on weight. The different weights correspond to different boiling points in the differing hydrocarbon reaction product compounds. The separating portion thus functions with simpler equipment and less energy use than conventional distillation columns.

It is therefore a primary object of the present invention to provide a method for refining hydrocarbons such as heavy oil or bitumen-like hydrocarbons without using complex, expensive conventional refining and hydro-processing.

It is another object of the present invention to provide a method for upgrading heavy oil or bitumen-like hydrocarbons at a significant cost savings by avoiding the need for additional reagents such as hydrogen, solvating hydrocarbons or expensive solid catalysts and equipment.

It is another object of the present invention to provide a method for upgrading heavy oil or bitumen-like hydrocarbons that will not produce the same amount of carbon dioxide from the heating operations associated with conventional refining and reduce the carbon footprint for producing high-value hydrocarbons.

It is still a further object of this invention to upgrade heavy oils and bitumen-like hydrocarbons to provide a method that will not produce the amount of coke and solid carbonaceous material as other methods.

It is still a further object of this invention to upgrade heavy oils and bitumen-like hydrocarbons with a method that allows for recycle of process material and better process control than other heavy oil upgrading techniques that propose using supercritical fluids.

It is still a further object of this invention to upgrade heavy oils and bitumen-like hydrocarbons with a method that enhances the safety of process operators by reducing processing complexity and reducing or eliminating combustible and hazardous reagents.

These and other objects of the present invention will become apparent to those skilled in the art upon reading the accompanying description, drawings, and claims set forth herein.

DETAILED DESCRIPTION OF THE INVENTION

Figure 1:
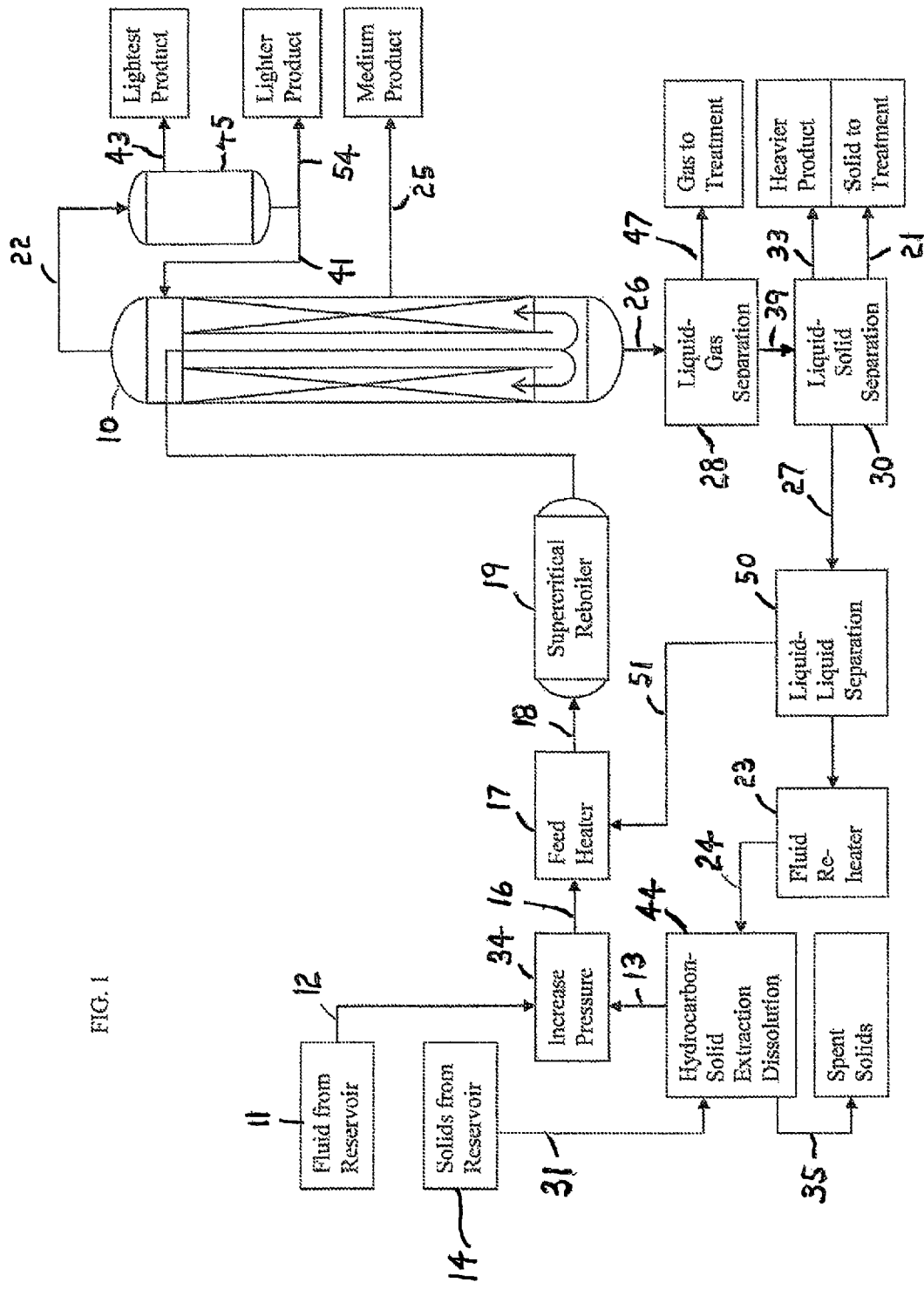
FIG. 1 is a schematic diagram of a processing configuration according to a first embodiment of the present invention, whereby heavy oil or bitumen-like material is extracted from heavy oil, oil-bearing solids, or from thermal fluid recovery from a subsurface geologic reservoir, and subsequently processed.

"Heavy oil" is a hydrocarbon with American Petroleum Institute (API) gravity lower than 20 degrees. It often contains sulfur compounds, corrosive components such as naphthenic acid, and associated heavy metals that are removed as part of the upgrading process. "Bitumen" and "bitumen-like" are defined as a hydrocarbon with a viscosity greater than 1000 cp at standard temperature and pressure. Supercritical fluids or fluid mixtures (typically aqueous) in a reactor portion of the system or method of the invention extracts the heavy oil/bitumen from a solid, then thermally splits the higher molecular weight hydrocarbons into lighter, more volatile hydrocarbons of higher value. The reaction portion of the system and method delivers the lighter weight, volatile hydrocarbons to a contacting portion of the system and method which uses a thermal or pressure gradient, and multi-phase contact or thermal or momentum diffusion, to separate the hydrocarbon mixture into portions that are viable for use or sale without further refining.

The present invention exploits the fact that the solubility product of water in its supercritical region is several orders of magnitude larger than at subcritical conditions to produce OH— radicals that increase a thermal cracking reaction. In a preferred embodiment, this is enabled by the large change, essentially a reversed dielectric coefficient, which enables the supercritical water to dissolve hydrocarbons and provide a homogeneous fluid with much higher heat transfer and self-diffusion characteristics. The heat transfer and diffusion coefficients are much higher in a supercritical fluid, accelerating the reaction faster. A base, preferably but not limited to either NaOH, KOH, NH3OH or $Ca(OH)_2$, or mixtures of these, is added to the fluid mix to increase further the OH concentration, thereby yielding even higher reaction rates. Sulfur is broken away from the polymer like hydrocarbon, and goes into the water phase where it is believed to be oxidized to a sulfate, and thereafter combines with a sodium or potassium in the water and is then removed from the hydrocarbon. Because the solution is very basic, it neutralizes any napthenic acids lowering the acidity and precipitates any metals, like nickel or vanadium, removing them from the hydrocarbon. The free hydrogen from the water, per the equation $H+OH=H_2O$, reacts with the "broken" ends of the hydrocarbon, raising the hydrogen content and increasing the value of the oil (per the API gravity of the oil). The cracking into smaller hydrocarbons compounds and breaking up the polymer decreases viscosity, making it "pumpable" in a pipeline. And by adding oxygen or air, the partial oxidation of the heavy hydrocarbon produces heat driving the reaction and carbon monoxide that reacts with the water to form hydrogen in-situ, also increasing the API gravity of the oil.

Once the hydrocarbon is in the supercritical water phase, an original idea was to separate it by contacting the supercritical gas with a condensed water-hydrocarbon phase similar to conventional distillation. The present system and method, however, exploit higher heat transfer and diffusion properties, plus the solubility characteristics.

The drawings depict two ways for transporting hydrocarbons to the supercritical refining process. The system according to the invention is capable of processing either heavy oil or bitumen-containing solids.

FIG. 1 shows a process schematic of the best mode contemplated for using supercritical fluid or fluid mixtures, typically water to refine heavy oil and bitumen-like compounds according to the present invention. In a first mode and system illustrated in FIG. 1, a hydrocarbon fluid or fluid mixture 11 from a reservoir (e.g., either the subsurface geologic reservoir or a storage tank) is transported via pipe 12 to a pump 34. The pump 34 increases the hydrocarbon fluid pressure to a pressure above the critical pressure of the fluid. Various chemical additives, such as air or oxygen to promote partial oxidation of the hydrocarbon to provide additional energy to heat the mixture or to provide additional hydrogen, can be added at the pump 34 depending on the hydrocarbon being processed. Thus a method according to this disclosure may include the step of producing additional hydrogen by reacting a portion of the hydrocarbons with air or oxygen, in a reboiler 19, to produce hydrogen from a water-gas shift reaction. Further, a portion of the carbon dioxide in the mixture may react with hydrogen in a reverse water-gas shift.

Another pipe 16 carries the pressurized fluid mixture to a feed heater 17 where the temperature of the pressurized fluid is increased to above the critical temperature of the fluid. The fluid mixture in the feed heater 17 then is at the supercritical state, and is mostly a dense gas. The supercritical hydrocarbon fluid mixture is then transported via pipe 18 to a supercritical reboiler 19. Hydrocarbons in the supercritical reboiler 19 are thermally cracked to smaller, lighter compounds and (depending on the additives) react with hydrogen in the reboiler to provide a more volatile hydrocarbon. If the supercritical fluid mixture contains water, this thermal cracking process is aided by the higher water solubility coefficient in the supercritical state. In the reboiler 19 additional hydroxyl radicals increase the thermal cracking reaction, and "cracks" the larger molecular weight molecules into smaller molecular weight molecules. In this manner, heavy oil and/or bitumen-like compounds are refined in a supercritical reboiler 19 and then separated in a separating unit 10.

In a second possible mode and system, in a hydrocarbon solids extraction dissolution step (designated at 44 in FIG. 1) a supercritical fluid or fluid mixture from pipe 24 dissolves heavy oil or bitumen-like compounds 14 (such as coal or bitumen-containing solids) transported from the reservoir (geologic or artificial) via transporter 31. The transporter 31 could be, for example, a slurry in a pipe, or a mechanical conveyor. The supercritical fluid and hydrocarbons resulting from the extraction dissolution step 44 can be mixed with additional fluids, such as the hydrocarbon fluid steam 11 introduced by pipe 12 from the reservoir, or used alone. The supercritical fluid and hydrocarbons resulting from the extraction dissolution step 44 are transported via pipe 13 to a pump 34 to provide pressurized feedstock in pipe 16.

It may be preferred to add ammonium hydroxide to the supercritical mix, essentially adding ammonia and amine compounds such as triethanolamine to improve the hydrocarbon solubility (i.e. lowering the temperature and pressure at which hydrocarbons dissolve), and to serve as additional hydrogen-producers in-situ. There may be other compounds having similar chemical traits that may so serve as well. The ammonia is believed to decompose, and the ethanol reacts to form additional hydrogen. A method according to the present invention thus may include a step of producing additional hydrogen by supplying to the supercritical fluid at least one additive, preferably added to the mixture flow upstream from the reboiler 19, selected from the group consisting of ammonia and tri-ethanolamine, that decomposes to provide hydrogen.

Further, it has been determined that if the KOH concentration of the mix is increased to over approximately 5-6 M, it may be possible to get over 90% of the carbon out of coal solids in the mix. After the hydrocarbon is in solution, one can use a variety of methods to separate compounds of different molecular weights. For example, pressure gradients similar to those used to enrich uranium may be used to accomplish hydrocarbons separation. Indeed, nearly any enrichment method other than chemical exchange can be used according to the system and method to separate the differing weight compounds.

The resulting mixture of a fluid (typically water or water mixture) and heavy hydrocarbons is sent via pipe 16 to a feed heater 17. The feed heater 17 heats the fluid mixture to temperatures in the supercritical regime, at that pressure for that fluid, and delivers the mixture stream via pipe 18 to a supercritical reboiler 19, and then to an associated separating unit 10. Further product refinement occurs in the separating unit 10, either by repeated contact between different phases, such as liquid and dense gas, or by using a thermal or pressure gradient to separate reaction product compounds in the mixture by their weights. Examples of using different phases to separate compounds would be a crude oil distillation column. An example of using a thermal gradient to separate compounds would be a Clusius-Dickel column used to separate isotopes. An example of using a pressure gradient to separate reaction products compounds using a pressure gradient would be a Becker nozzle used to separate isotopes.

Reaction products are removed from the separating unit 10, depending on the product's volatility or other physical or chemical properties, at upper tap lines 22 for lighter compounds, at intermediate tap lines 25 for medium compounds, or lower tap lines 26 for heavier compounds. For operations using different phases such as a liquids, gas, or solids, liquid-gas separation occurs in a liquid-gas separation unit 28, and liquid-solid separation occurs in a liquid-solid separation unit 30; this allows separating unit 10 maintenance, and enhances operation depending on the feed composition.

Supercritical fluid containing the higher volatility hydrocarbons is transported via line 22 to a condenser 45 which condenses a portion of the dense gas to a liquid. Condensed liquid is removed from the condenser 45 and either returned to the separating unit 10 via return pipe 41 or sent to product storage via pipe 54. The lightest product is removed via pipe 43. Supercritical fluid containing medium volatility hydrocarbons is removed from the separator column via line 25. Any liquids containing dissolved solids are removed from the separating unit 10 via line 26 to the liquid-gas separation unit 28 to reduce pressure; the resulting gas is recycled to treatment via pipe 47. The solids-containing liquids are sent to a liquid-solid separation step 30 via pipe 39. A portion of the separated liquid (heavy reaction product) may be sent for treatment or storage via pipe 33, and the separated solids are sent for treatment or storage via pipe 21.

The higher weight hydrocarbons are separated from solids in the liquid-solid separation unit 30, and the resultant liquid mix is sent via pipe 27 to a liquid-liquid separator unit 50 where the hydrocarbons are separated from the supercritical working fluid. The hydrocarbons are sent via return pipe 51 to the feed heater 17, thereafter to be recycled via pipe 18 to the supercritical reboiler 19 and the separating unit 10. The supercritical fluid, typically mostly water, is sent to a fluid re-heater 23 and then returned via pipe 24 to the hydrocarbon-solid extraction unit 44. In the hydrocarbon-solid extraction unit 44 the supercritical fluid is mixed with hydrocarbon containing solids, such as coal or bitumen containing solids, to dissolve the hydrocarbons. This resulting mixture carries the hydrocarbon to the pump 34 for eventual processing through the feed heater 17, supercritical reboiler 19, and separating unit 10. The spent solids with the hydrocarbon portion removed are removed via pipe 35 and sent to storage or further treatment. Also, un-reacted material may be recycled to the process system via either or both of return pipes 41 or 51.

Figure 2:
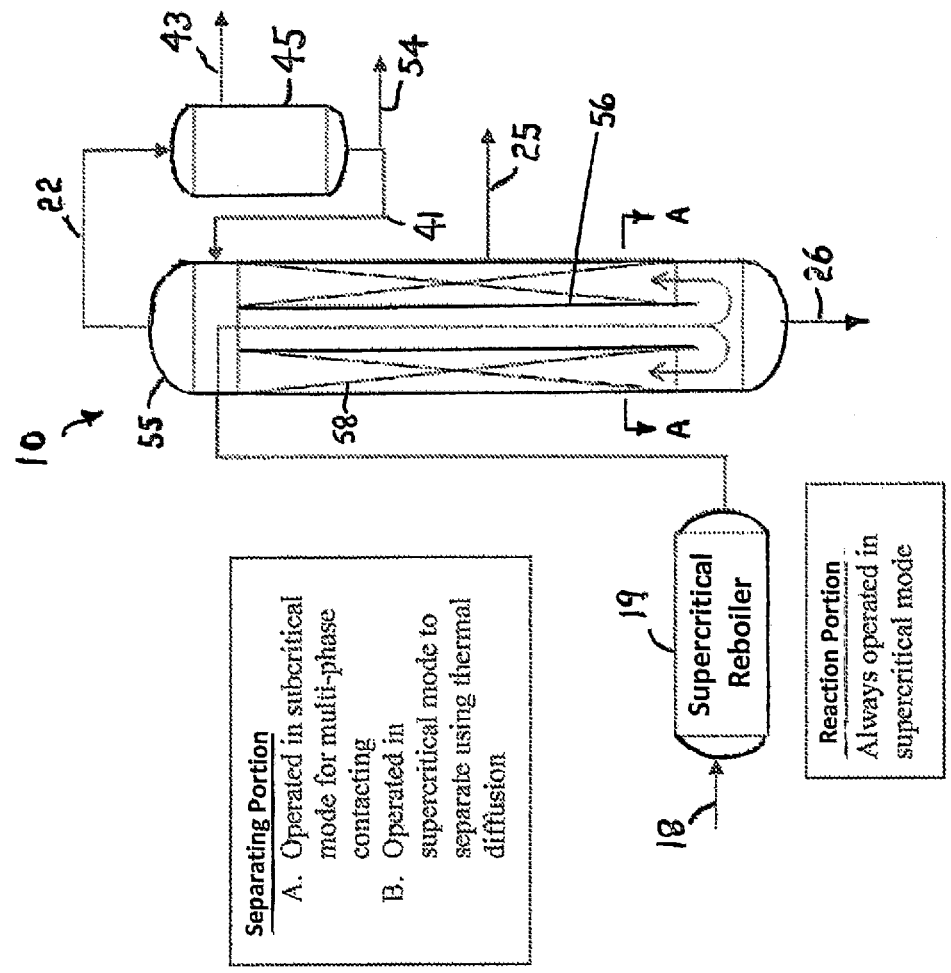
FIG. 2 is a schematic diagram detailing a portion of the processing configuration illustrated in FIG. 1, showing operating modes of a separating portion of a system according to the invention.

FIG. 2 offers a simplified process schematic for the reactive refining portion of the best mode of the present systems and methods. The supercritical reboiler 19 operates at supercritical conditions for the chosen fluid or fluid mixture. The separating unit 10 is operable in different embodiments at temperatures and pressures exceeding subcritical temperature-pressure regime for the chosen fluid or fluid mixture. The hydrocarbon-bearing supercritical fluid mixture feed is transported via the pipe 18 into supercritical reboiler 19 where the hydrocarbons are cracked and higher weight compounds are reduced to lower weight compounds. The different weight distributions of the cracked hydrocarbons then allows for separation of reaction products either by their differing boiling temperatures, or by weight differences, in a thermal or pressure gradient. This supercritical fluid mixture of reaction products is then delivered to the center of the separating unit 10.

Figure 2A:
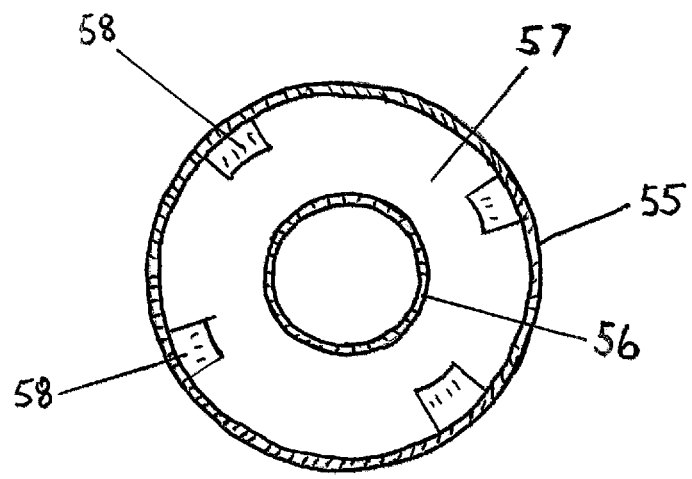
FIG. 2A is a sectional view taken along section line A-A in FIG. 2, showing a possible transverse or radial configuration of the separating portion of the system.

The separating unit 10 preferably is a substantially closed hollow vessel 55 of suitable size (depending on processing throughput) and shape, and as shown in FIG. 2 is generally cylindrical with closed ends. In a preferred embodiment, the cylinder axis is approximately vertical such that gravity tends to draw vessel contents toward the bottom of the separating unit 10 (e.g., in the vicinity of the lower tap line 26), while hot fluids tend to rise upward therein. In the preferred embodiment, a generally tubular inner column 56 is situated within the interior of the separating unit vessel 55. The wall of the column 56 is fabricated from a suitably durable material, for example stainless steel. As seen in FIG. 2A, the column 56 preferably but not necessarily is coaxial with the cylindrical vessel 55; accordingly, there is an intermediate volume space 57 defined between the outer surface of the cylindrical wall of the column 56 and the inside wall of the vessel 55, and which extends at least the length of the inner column. The inner column effectively is a vertically disposed conduit, and has an open upper end and an open lower end, such that fluids may flow the length of the column's interior.

The inner column 56 centrally disposed in the vessel 55 if the separating unit 10 integrates heat energy into the separator more efficiently. Also, by changing the operating pressure in the separating unit 10, operation thereof can be changed from a "distillation" mode into a thermal diffusion mode. See, e.g. http://deepblue.lib.umich.edu/bitstream/handle/2027.42/72201/j.1749-6632.1966.tb49745.x.pdf;jsessionid=7D56523357C587A263ADE857F58CEAA3?sequence=1)

Continued reference is made to FIGS. 2 and 2A. One or more baffles structures 58 are mounted within the separating unit 10 in the volume space 57 between the inside wall of the vessel 55 and the outside surface of the inner column 56. "Baffles structures" may include suitable packing materials, substantially rigid baffles and/or weirs, concentric tubes, divided walls and/or plates, wire screens, and/or other components or materials configured and located so to controllably affect fluid flow in the intermediate space to promote phase contact of mixed hydrocarbon-bearing fluids moving in the intermediate space.

The separating unit 10 is operated to maintain the wall of the inner column 56 at a first temperature significantly higher than the temperature of the wall of the vessel 55. This temperature differential enables some of the compounds flowing through the separating unit 10 to condense on the inside of the vessel wall. The condensed liquid compounds may then move by gravity down toward the bottom of the vessel 55 of the separating unit 10. Dense gas phase compounds, however, rise in the intermediate space 57 between the wall of the vessel 55 and the wall of the inner column 56; rising in the intermediate space, the dense gas compounds come into contact with the wetted inside wall of the vessel 55 in a countercurrent manner (e.g., against the flow of the condensed liquids), promoting further refinement and separation of the compounds in the mixture. For example, a water-hydrocarbon mixture flowing in the intermediate space 57 allows condensation, on the inside of the colder outer wall of the vessel 55 of the separating unit 10, of the remaining higher boiling temperature hydrocarbons. For water, the critical point is 374° C. and 217.7 atmospheres.

It is seen, therefore, that a temperature gradient is imposed within the separating unit 10 by passing a hot fluid down the central interior of the inner column 56, thus heating the wall of the inner column to a temperature substantially hotter than the inside wall surface of the vessel 55. The intermediate space 57 between the inner column 56 and wall of the vessel 55 contains the phase contacting baffling structures 58 (such as staggered plates, packing, concentric tubes, divided walls, or other elements) that promote appropriate phase contact for the particular mode of separating unit 10 operation. Preferably, contact between flowing mix phases is promoted by baffle plates evenly spaced axially to enhance contact, though other means could be used to ensure good phase contact throughout the annular intermediate space 57 of the separating unit 10. The intermediate space 57 contains the condensed liquid flows; thus the baffling structures 58 catch or collect at least some of condensed liquid phase to enhance the liquid phase's contact with a rising gas phase in the intermediate space. Alternatively or additionally, baffling structures 58 may include packing, such as wire mesh or ceramic rings, functioning to spread out the liquid phase thereby increasing the total surface area of liquid phase exposed for contact with the vapor phase; this increased liquid phase surface area increases the efficiency of transferring lighter compounds to the rising gas stream, and heavier compounds to the heavier liquid stream. Depending on the extent of the previous thermal cracking, the expected ratio of light to heavy compounds determines the best type of enhanced phase contact material and configuration of baffle structures.

The supercritical reboiler 19 is operated at supercritical conditions for the chosen fluid or fluid mixture, typically water between 23 MPa and 70 MPa and between 400° C. and 950° C. It is recommended that the separation unit 10 be operated at the appropriate pressure by varying the rates at which fluid mix is added, and material removed, from the unit 10 so that a "pool" of condensed fluid can be formed in the bottom of the contacting unit's vessel 55. This fosters the removal any insoluble solids that may be formed at the conditions within contacting unit 10, thus solving a problem with other known means and methods using supercritical fluid or fluid mixtures.

The fluid mixture stream in lower tap line 26 is separable into a stream for treatment and possible discard, and un-reacted hydrocarbon components can be returned to the system for further processing. This recycling of un-reacted components of the hydrocarbon mix overcomes the problem of dealing with un-reacted hydrocarbons, a drawback with known hydrocarbon refinement means and methods using supercritical fluid or fluid mixtures. The selection of the separation unit's operation mode, either for contacting different phases (e.g. liquids or gases), or to perform the separation in the gas phase using a thermal or pressure gradient, depends on the economics of the energy used and the value of the hydrocarbon products separated. For example, for fluids (such as carbon dioxide) having relatively lower critical points, the operation may be less expensive to operate in a thermal diffusion mode. On the other hand, for water the economics may be improved with the mode of contacting liquids with gases.

Figure 3:
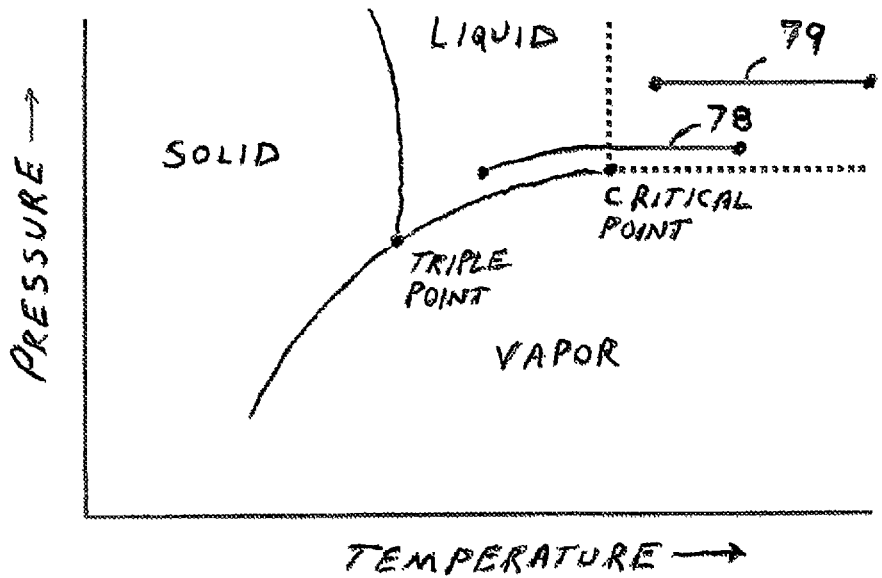
FIG. 3 is a generic fluid pressure versus temperature graph showing possible operation lines for embodiments of the system and method according to the present invention.

FIG. 3 shows graphically possible thermal operating lines for exemplar functional concepts for the supercritical reboiler 19 and separating unit 10 of the system. FIG. 3 is by way of example rather than limitation, and does not necessarily constrain the operating conditions for the supercritical reboiler 19 and separating unit 10 according to the system and method. Rather, FIG. 3 illustrates how the conditions vary from supercritical to subcritical within the supercritical reboiler 19 and separating unit 10; by regulating the pressure and temperature, the system may be operated selectively in a mixed subcritical-supercritical mode, or in a solely supercritical mode.

Heavy hydrocarbons react in the supercritical fluid or fluid mixture within the supercritical reboiler 19 in a manner that produces lighter, more volatile reaction products or compounds having different molecular weights or other chemical or physical properties. In one preferred embodiment of the invention, the separating unit 10 operates at the same or slightly lower pressure than the supercritical reboiler portion 19 of the system. The lighter reaction products then move up within the vessel of the separating unit 10, from which medium weight products can be removed at an appropriate location such as intermediate tap line 25. The lighter and lightest products conveyed in upper tap lines 12 can be partially condensed in condenser 45, and taken off via outlet lines 43 and 54; a portion thereof may be returned (e.g., via return pipe 41) to the separating unit 10 to provide additional enrichment of selected products. Such enrichment occurs because remaining light compounds in the liquid thus returned to the separating unit 10 are dissolved in the gas phases rising therein, and are thereby effectively separated.

Operating the system in a mixed supercritical-subcritical mode allows a broader range of feed components to be processed, which in turn provides a wider range of application for the process. In the mixed subcritical supercritical mode, the thermal gradient 78 as shown in FIG. 3 effects a phase change, and allows separation of the fluid and hydrocarbon mixture. As described above, the contacts between the different phases enriches certain components and further fractionates the products into higher value hydrocarbon materials.

Continued reference to FIG. 3 discloses possible operational parameters of a second embodiment of the present invention. A temperature gradient 79 is imposed while maintaining a constant pressure, so that separating unit 10 operates within the supercritical pressure-temperature regime for the chosen fluid or fluid mixture. The gradient 79 is imposed by passing hot fluid mix down the interior of the inner column 56, and allowing the fluid mixture to exit the bottom of the inner column 56 to contact the cooler wall of vessel 55 of the separating unit. The hotter wall of the inner column 56 and cooler wall of the vessel 55 causes the fluid mixture to circulate in the intermediate space between these two walls. As the fluid mixture circulates within the intermediate space, hotter fluid rises and cooler fluid falls. Depending on critical temperature and the flow rate of the fluids to be treated, the radial separation between the inner column 56 and inside wall of the vessel 55 may be between a few inches to approximately several feet. In this mode, thermal diffusion of the various reaction product compounds in the fluid mixture, within a single phase, is believed to effect a separation of compounds with boiling temperatures that differ by a only few degrees.

Thus higher thermal diffusion coefficients, usually an order of magnitude larger in supercritical fluids than in simple liquids, enables separation of reaction products compounds with boiling temperatures that only differ by only a few degrees, such as isomers and isotopes in mixtures.

The temperature gradient 79 thus is imposed between two walls of differing temperature. Further, the intermediate space 57 between the walls optionally but preferably contains additional baffle structure, such as plates, packing, concentric tubes, divided walls or other structural configurations that stabilize the appropriate circulation pattern for the particular mode of operation. The baffles structures serve as a means for reducing or controlling convective currents while all sections are in supercritical conditions, to improve the separation by diffusion of reaction products. Both the supercritical reboiler 19 and the separation unit 10 preferably operate at supercritical conditions for the chosen fluid or fluid mixture, and product components are separated by a temperature gradient applied within the process envelope for supercritical conditions. The temperature difference can be very large and would only be constrained by the temperature that the construction material of the separating unit 10 and the critical temperature of the fluid mixture under treatment.

Thus both the supercritical reboiler 19 and the separating unit 10 operate preferably at supercritical conditions for the chosen fluid or fluid mixture, preferably an aqueous mixture, and typically between 23 MPa and 70 MPa and between 400° C. and 950° C. The lighter components then travel upward within the separating unit 10; and medium weight components may be removed at the appropriate location, such as an intermediate tap line 25. The lighter and lightest components are removed from the separating unit 10 at an upper tap line 22, and may be separated in condenser 45 and taken off via pipes 43 and/or 54. A portion of light weight products may be returned to the separating unit 10 via pipe 41 to provide additional enrichment of selected components, thus allowing a wider range of feed components to be processed, expanding the utility of the method and system. The mixture stream exiting the separating unit 10 via lower tap pipe 26 can be separated into a stream for recycle via return line 51. This recycling of heavier components meets the need to deal with unreacted hydrocarbons, a need unmet in known systems using supercritical water or water mixtures.

Figure 4:
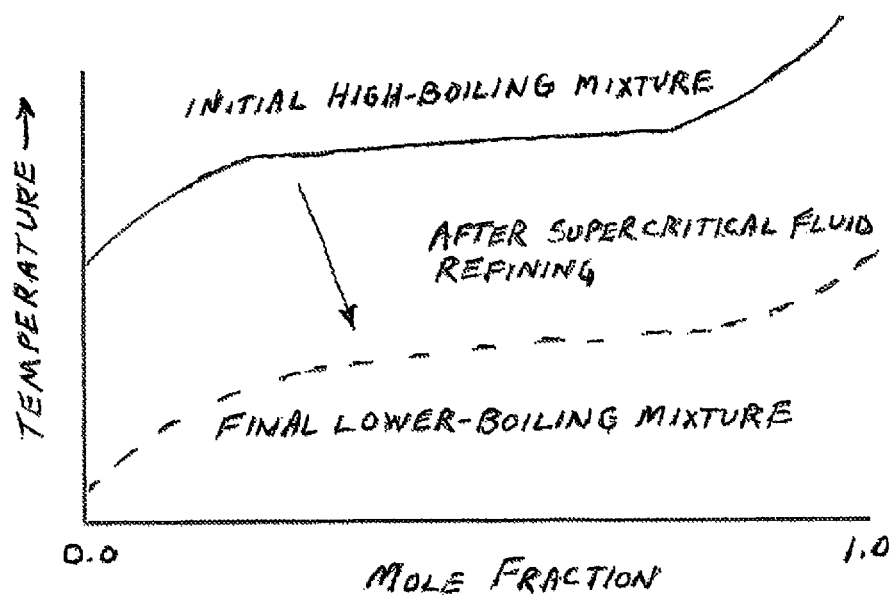
FIG. 4 is a schematic of a typical true boiling point curve (temperature versus mole fraction), illustrating how the curve can be shifted for improved refining, or thermal or pressure diffusion separation, by supercritical reaction.

The problems addressed by the present system by using supercritical water or water mixtures are many. FIG. 4 depicts how a higher boiling point mixture reacts, forming a mixture of lower boiling compounds that is then separated in the separating unit 10 operating in either subcritical or supercritical operation, depending on the most efficient method for separating a particular feed. The most efficient method (supercritical, subcritical, or mixed supercritical/subcritical) may be determined mostly from the known economics of the energy required to reach the critical point, the value of the products, the separation efficiency required, or type of separation required (such as separating compounds that have boiling temperatures that only differ by a few degrees, or other similar physical of chemical properties). The disclosed supercritical fluid (typically aqueous) refining approaches avoids using complex, expensive conventional refining techniques that require special reagents, such as hydrogen and expensive catalysts or large conventional distillation columns. The disclosed supercritical water or water mixture method also uses less energy than conventional processing, and therefore releases less carbon dioxide to the atmosphere and has a smaller carbon footprint. The method readily recycles unreacted material, and removes coke and heavy carbonaceous deposits that plague other types of technology. And the present system and method also improves personnel safety by reducing the number of processing steps and amount of hazardous reagents.

Figure 5:
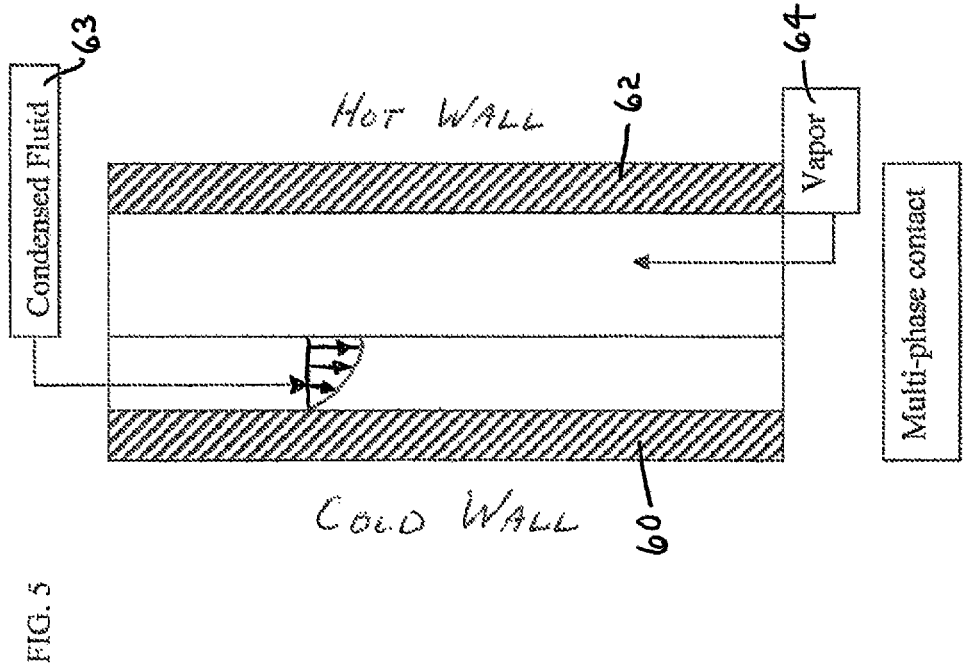
FIG. 5 is a diagram illustrating an embodiment of the process according to the present invention for using multi-phase contact, in a separating portion of the system, to separate hydrocarbons in a supercritical fluid.

Attention is invited to FIG. 5, which diagrammatically details certain operational features of the separating unit 10 when used in the supercritical fluid refining method. The separating unit 10 receives the lower volatility lower weight compounds (which have lower molecular weights, or other distinguishable chemical or physical characteristics) from the cracking operation in the supercritical reboiler 19. The separating unit 10 separates these compounds by different pressure-temperature regimes using multi-phase contact.

FIG. 5 illustrates in a general schematic how, during system operation, the relatively colder inside surface of wall 60 (e.g., wall of the separating unit's vessel 55) has a liquid 63 flowing down the wall 60. The condensed liquid 63 flows (as by gravity) while in coming in contact with a hotter fluid or gas 64. The hot fluid 64 rises inside the intermediate space within the separating unit, while contacting with the hot wall 62 (e.g. outside surface of the inner column 56). The wall 62 of the inner column is heated by the incoming supercritical fluid mixture from the supercritical reboiler 19 as it flows inside the interior column 56. The outer wall 60 is cooled by a variety of means, typically, from varying the type and thickness of insulation on the outer wall. This simplifies the system, and allows efficient heat integration between the supercritical reboiler 19 and the separating unit 10. Multi-phase contact occurs when the liquid 63 condensing on the colder outer wall 60 comes into contact with the gas 64 heated by the hotter inner wall 62. The liquid 63 moves by the force of gravity downward in the separating unit 10, and contacts the rising hotter gasses 64. The lighter reaction product compounds in the condensed liquid 63 are removed by the rising gas 64, enriching the gas in the lighter compounds and thereby causing improved separation.

Different hydrocarbon mixtures can be processed by selectively modifying the extent of cracking that occurs in the supercritical reboiler 19. This may be accomplished by changing the temperature, pressure and/or mixture residence time in the supercritical reboiler 19. Higher temperatures and pressures or longer residence times crack the hydrocarbon fluid mixture to a greater extent, generating a different mix of lighter reaction product compounds. The exact mixture of hydrocarbons, the amount of sulfur included in the hydrocarbon mix, and any other impurities (such as naphthenic acids, metallic compounds such as nickel or vanadium) influences the selection of the operating conditions for the supercritical reboiler 19 and separating unit 10. The pressure in the separating unit 10 may be controlled by varying the flow in and out of the separating unit 10. Temperature regulation in the separating unit 10 may be achieved by controlling the volume flow from the supercritical reboiler 19 into the separating unit 10.

Figure 6:
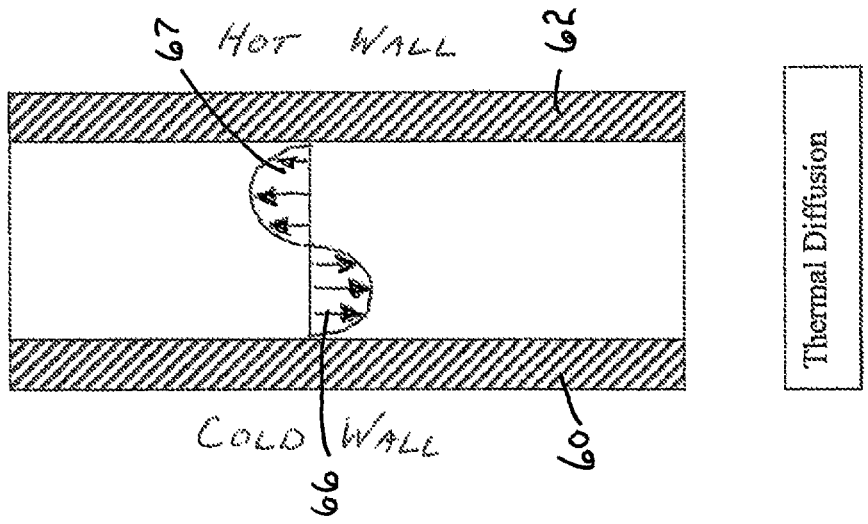
FIG. 6 is a diagram illustrating an alternative embodiment of the process according to the present invention for separating hydrocarbon compounds, in a separating portion of the system, using thermal diffusion in a supercritical fluid.

FIG. 6 is a generalized illustration of an alternative mode of operating the separating unit 10 employed in the system for supercritical fluid refining. The separating unit 10 receives the lower volatility, lower weight, compounds in the fluid from the cracking operation in the supercritical reboiler 19. In this mode, these lower volatility compounds have lower molecular weights, or other chemical or physical characteristics, which separate from a single supercritical dense gas using a thermal diffusion process. FIG. 6 shows that in a thermal diffusion mode of operation, the colder outer wall 60 of the separating unit 10 (e.g., the wall of the vessel 55) has cooler, comparatively dense gas 66 flowing down adjacent the wall 60, while also coming into contact with a hotter gas 67 moving up the separating unit 10 adjacent the inner wall 62. This circulation pattern is well-known as natural circulation. In a preferred embodiment, the inner wall 62 is heated by supercritical fluid mixture flowing along the wall 62 from the supercritical reboiler 19. The outer wall 60 is cooled by any suitable means, typically, from varying the type and thickness of insulation on the outer wall. This simplifies the system and allows efficient heat integration between the supercritical reboiler 19 and the separating unit 10.

In this thermal diffusion mode of operation, reaction product separation occurs because the compounds with different weights travel at different velocities in the up and down directions in the separating unit 10. Heavier compounds tend to concentrate nearer the walls 60, 62, while the lighter compounds tend to migrate and concentrate generally in the middle of the intermediate space between the inner wall 62 and outer wall 60. The heavier compounds accordingly can be separated by removing a portion of the gas closest to one or both walls 60, 62. Different hydrocarbon mixtures can be processed by selectively modifying the extent of cracking that occurs in the supercritical reboiler, by changing the temperature, or pressure, or length of time the mixture spends in the supercritical reboiler 19. Higher temperatures and pressures, or longer residence times, crack the hydrocarbon-bearing fluid mixture to a greater extent, providing a different final mix of lighter reaction product compounds. The exact mixture of hydrocarbons, the amount of sulfur included in the hydrocarbon mix and any other impurities, such as naphthenic acids, metallic compounds such as nickel or vanadium affect the selection of final operating conditions for the supercritical reboiler 19 and separating unit 10.

Figure 7A:
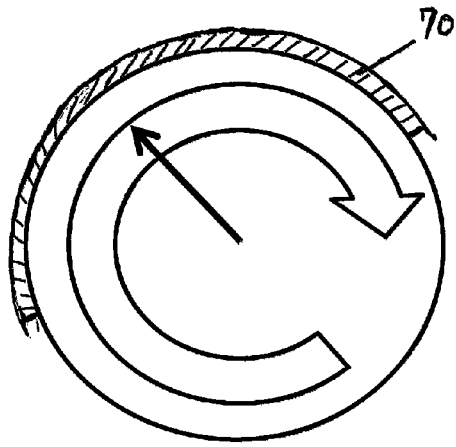
FIG. 7a is a diagram illustrating an alternative embodiment of the process according to the present invention for separating, in a separating portion of the system, hydrocarbon compounds using momentum diffusion in a supercritical fluid.

FIG. 7a is a simplified schematic showing an alternate mode and configuration for the separating unit 10 of the supercritical fluid refining method. The separating unit 10 receives the lower volatility compounds from the cracking operation in the supercritical reboiler 19, that have lower molecular weights or other chemical or physical characteristics, and separates using a momentum gradient in a single supercritical gas phase. At least one curved wall 70 is provided within the separating unit 10. In one possible embodiment, the wall 70 is the wall of the vessel 55 itself. Alternatively, one or more curved walls 70 may be provided within the vessel 55. Supercritical fluid to be treated is introduced into the inside of the curved wall 70, which wall in some embodiments may define an open-ended cylindrical tube.

The fluid moves within the inside of the curved wall 70. A curved and/or rotating flow, suggested by the broad curving arrow of FIG. 7a, is induced in the fluid to cause the heavier molecules to separate from the lighter molecules. Curved flow, such as that suggested in FIG. 7a, is directed by the curvature of the wall 70; curved flow also may be initiated or promoted with fluid nozzles (not shown in FIG. 7a) directing fluid flow as indicated by the broad rotational directional arrow of FIG. 7a. Desired separation occurs because the compounds with different weights travel at different velocities in the curved flow. Due to the different speeds of compounds of differing weight, movement along the narrow, radial, directional line in FIG. 7a is slower for light compounds than for the relatively heavier substances. Consequently, the heavier compounds tend to concentrate toward the wall 70 and the lighter compounds migrate away from the wall, resulting in a rotary or curved flow. Other methods, such as a centrifuge, can be used to provide a pressure gradient within the separating unit 10, and are within the scope of the invention. In a centrifuge, spinning the gas causes the heavier compounds to migrate and concentrate toward the outer wall causing the lighter compounds to concentrate toward the center. The heavier compounds can be separated by removing a portion of the gas closest to the wall.

Figure 7B:
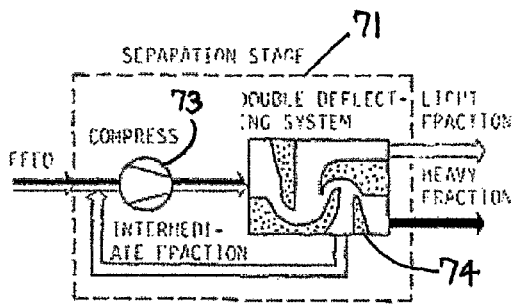
FIG. 7b is a diagram illustrating an alternative embodiment of a system and process according to the present invention for imparting a curved motion to the flow using a nozzle and double deflecting subsystem to generate a pressure gradient from the momentum of the fluid to separate the heavier compounds from lighter compounds.

FIG. 7b illustrates an embodiment of a possible nozzle subsystem, arranged within the interior of the separating unit 10 of the overall system, for forcing or imparting a curved motion to the supercritical fluid. As mentioned, the curved or rotating motion causes the momentum to generate a pressure gradient, which gradient moves the heavier compounds to a wall, permitting separation of light weight compounds from heavier compounds. For example, one or more appropriately configured barrier(s) may be disposed at or near one or more walls to redirect and separate the heavy compounds from lighter compounds. The separation enables, for example, a portion of these reaction products to be returned to the reboiler 19 for further processing.

As seen in FIG. 7b, the nozzle separation stage 71 according to this embodiment may involve the direction of the reaction products feedstock through a first compressor nozzle 73 or other means for accelerating the fluid flow. The accelerated fluid flow is substantially immediately directed into a double-deflecting system 74 incorporating an arrangement of walls, including at least one and preferably two or three curved walls, which impart curved flow on the fluid. Preferably, and as indicated in FIG. 7b, the fluid flow in a double- (or triple-) deflecting system 74 is repeatedly re-directed by one or more pairs of curved walls in mutually confronting relation, causing the momentum shifts which progressively accumulate the heavier compounds at or near the walls. As also suggested in FIG. 7b, the respective radii of curvature of the walls may differ amongst and between the various deflecting walls in the double-deflecting system. By way of example only, the radii of curvature may decrease progressively, proceeding through the double-deflecting system 74. The heaviest compounds in the fluid stream are collected along the walls. As further suggested by FIG. 7b, the walls may be arranged to allow the lightest fraction of the fluid compounds to be tapped off first (e.g., after having flowed past only the first curved deflector wall), an intermediate weight fraction to be tapped off next (e.g., after having flowed past two deflector walls), and the heavy fraction is finally discharged after having been redirected by three or more walls and/or barriers. FIG. 7b also indicates the possibility of recycling the separated intermediate fraction (for example) of the fluid flow back into the feed flow for the separation stage 71.

Figure 7C:
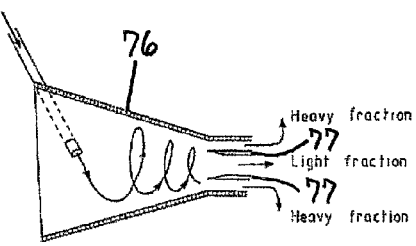
FIG. 7c is a diagram illustrating an alternative embodiment of a system and process according to the present invention for imparting a curved motion to the flow using a vortex tube to cause a pressure gradient from the momentum of the fluid to separate the heavier compounds from lighter compounds.

FIG. 7c shows an alternative embodiment of a momentum separation means using a vortex tube subsystem in the overall system of this invention. The fluid is introduced at substantial velocity into the wide end of a generally conical vortex tube 76, obliquely to the interior tube wall. The vortex tube 76 forces the supercritical fluid into an increasingly tighter spiral flow, thus imparting a curved motion to the fluid. The curved flow increases the fluid momentum, thereby generating a pressure gradient that moves the heavier compounds to the vortex tube's interior wall, and allowing barriers 77 to separate the lighter compounds in the center of the constricted flow from the heavier compounds at the vortex tube wall 76.

Different hydrocarbon mixtures can be processed by changing the extent of cracking that occurs in the supercritical reboiler, by changing the temperature or pressure or length of time the mixture spends in the supercritical reboiler 19. Higher temperatures and pressures or longer residence times crack the mixture to a greater extent providing a different final mix of lighter compounds. The exact mixture of hydrocarbons, the amount of sulfur included in the hydrocarbon mix and any other impurities, such as naphthenic acids, metallic compounds such as nickel or vanadium will determine the final operating conditions for the supercritical reboiler 19 and separating unit 10.

Thus it will be appreciated by those skilled in the art that the present invention is not restricted to the particular embodiments described with reference to the drawings, and that variations may be made therein without departing from the scope of the present invention as defined in the appended claims and equivalents thereof

What is claimed is:

1. A method for reactively refining hydrocarbons comprising the steps of:
   providing water at temperature and pressure above its critical point to reverse a dielectric coefficient of the supercritical water to approximate a dielectric coefficient of a hydrocarbon to be refined;
   increasing a pH of the supercritical water to increase a solvent capacity of the supercritical water, wherein the step of increasing the pH comprises adding to the supercritical water an inorganic salt, thereby increasing a concentration of free hydroxyl radicals to promote thermal cracking of hydrocarbons to be refined;
   increasing hydrogen contained in the supercritical water to promote reaction with dissolved hydrocarbons;
   mixing the supercritical water with a material containing the hydrocarbons to be refined, thereby removing heavy oil hydrocarbons and/or bitumen hydrocarbons from the material;
   mixing the supercritical water with the hydrocarbons to create a supercritical mix;
   using heat and pressure conditions above the critical point of the supercritical mix to thermally crack higher molecular weight hydrocarbon compounds to lower molecular weight hydrocarbon compounds, thereby generating at least two different reaction products; and
   contacting the reaction products to separate the different reaction products, wherein contacting the reaction products comprises:
      operating a separating unit in a supercritical mode for water;
      allowing a non-liquid phase of a reaction product to condense on a cold wall of the separating unit; and
      contacting, in the separating unit, a supercritical gas phase of a reaction product with the condensed liquid phase to dissolve lower weight compounds, thus separating lower molecular weight compounds from higher molecular weight compounds.

2. The method of claim 1 wherein the step of adding to the supercritical water an inorganic salt comprises adding, in the absence of a catalyst, a salt selected from the group consisting of $NH_3OH$, $Ca(OH)_2$, NaOH and KOH.

3. The method of claim 1 wherein the step of increasing the hydrogen in the supercritical water comprises adding to the supercritical mix at least one substance selected from the group consisting of ammonia, and ammonium compounds.

4. The method of claim 1 further comprising the step of supplying a fluid containing an oxidizing agent into a reactor to remove accumulated carbonaceous material from within the reactor.

5. The method of claim 4 wherein the step of supplying a fluid containing an oxidizing agent comprises supplying supercritical water mixed with an oxidizing agent to remove accumulated carbonaceous material from within the reactor or a downstream separating unit.

6. The method of claim 1 further comprising the step of supplying subcritical water into a reactor to remove accumulated salt material from within the reactor or a downstream separating unit.

7. The method of claim 1 wherein the step of providing water at a temperature and pressure above its critical point comprises providing the supercritical water at a pressure of between approximately 23 MPa and approximately 70 MPa, and at a temperature of between approximately 400° C., and approximately 950° C., and further comprising, after generating at least two different reaction products but before the step of contacting the reaction products, the step of combining the supercritical water and reaction products in a single-phase mixture to permit subsequent separation of reaction product compounds having boiling temperatures that only differ by only a few degrees.

8. The method of claim 2 wherein the step of adding a salt selected from the group consisting of $NH_3OH$, $Ca(OH)_2$, NaOH and KOH comprises adding a salt to increase the concentration of free hydroxyl radicals to the equivalent of adding to the supercritical water approximately 0.1 M to 1.0M NaOH.

9. The method of claim 2 wherein the step of adding a salt selected from the group consisting of $NH_3OH$, $Ca(OH)_2$, NaOH and KOH comprises adding a salt to increase the concentration of free hydroxyl radicals to the equivalent of adding to the supercritical water approximately 5M to 6M NaOH.

10. A method for reactively refining hydrocarbons comprising the steps of:
   providing water at temperature and pressure above its critical point to reverse a dielectric coefficient of the supercritical water to approximate a dielectric coefficient of a hydrocarbon to be refined;
   increasing a pH of the supercritical water to increase a solvent capacity of the supercritical water, wherein the step of increasing the pH comprises adding to the supercritical water an inorganic salt, thereby increasing a concentration of free hydroxyl radicals to promote thermal cracking of hydrocarbons to be refined;
   increasing hydrogen contained in the supercritical water to promote reaction with dissolved hydrocarbons;
   mixing the supercritical water with a material containing the hydrocarbons to be refined, thereby removing heavy oil hydrocarbons and/or bitumen hydrocarbons from the material;
   mixing the supercritical water with the hydrocarbons to create a supercritical mix;
   using heat and pressure conditions above the critical point of the supercritical mix to thermally crack higher molecular weight hydrocarbon compounds to lower molecular weight hydrocarbon compounds, thereby generating at least two different reaction products; and
   contacting the reaction products to separate the different reaction products, wherein the step of contacting the reaction products comprises:
      operating a separating unit in a supercritical mode for water;
      generating a thermal gradient in the separating unit to circulate reaction products therein; and
      circulating reaction products in the separating unit to separate higher molecular weight compounds from lower molecular weight compounds, without a phase change in reaction products, by causing the higher molecular weight compounds to move toward a wall.

11. The method of claim 10 further comprising the steps of:
   adding ammonia compounds to the supercritical mix to improve hydrocarbon solubility; and
   partially oxidizing the hydrocarbons to produce carbon monoxide that reacts with water, thereby producing additional hydrogen to improve a quality of the reaction products.

12. The method of claim 11 wherein the step of partially oxidizing the hydrocarbons comprises reacting a portion of the hydrocarbons with an oxidizing agent to produce hydrogen from a water-gas shift reaction.

13. The method of claim 11 wherein the step of partially oxidizing the hydrocarbons comprises supplying to the supercritical fluid at least one additive selected from the group consisting of ammonia and tri-ethanolamine, that decomposes to provide hydrogen.

14. The method of claim 11 wherein the supercritical fluid is water, which water at supercritical conditions releases free hydrogen.

* * * * *